United States Patent
Dyer et al.

(10) Patent No.: US 8,350,526 B2
(45) Date of Patent: Jan. 8, 2013

(54) STATION FOR RAPIDLY CHARGING AN ELECTRIC VEHICLE BATTERY

(75) Inventors: Christopher K. Dyer, Madison, NJ (US); Michael L. Epstein, Bedminster, NJ (US); Duncan Culver, Howell, NJ (US)

(73) Assignee: Lightening Energy, Dover, NJ (US)

( * ) Notice: Subject to any disclaimer, the term of this patent is extended or adjusted under 35 U.S.C. 154(b) by 0 days.

(21) Appl. No.: 13/190,225

(22) Filed: Jul. 25, 2011

(65) Prior Publication Data

US 2012/0043935 A1 Feb. 23, 2012

(51) Int. Cl.
*H02J 7/00* (2006.01)

(52) U.S. Cl. ........................................ 320/109; 320/104

(58) Field of Classification Search .................... 320/109
See application file for complete search history.

(56) References Cited

U.S. PATENT DOCUMENTS

| | | | |
|---|---|---|---|
| 3,844,841 A | 10/1974 | Baker | |
| 5,256,502 A | 10/1993 | Kump | |
| 5,346,786 A | 9/1994 | Hodgetts | |
| 5,393,617 A | 2/1995 | Klein | |
| 5,395,708 A | 3/1995 | Hall | |
| 5,429,643 A | 7/1995 | Lund et al. | |
| 5,552,243 A | 9/1996 | Klein | |
| 5,563,491 A * | 10/1996 | Tseng | 320/109 |
| 5,909,099 A * | 6/1999 | Watanabe et al. | 320/108 |
| 6,492,053 B1 | 12/2002 | Donelson et al. | |
| 6,887,620 B2 | 5/2005 | Klein et al. | |
| 7,163,761 B2 | 1/2007 | Debe et al. | |
| 7,622,897 B2 | 11/2009 | Eberhard et al. | |
| 2001/0049054 A1 | 12/2001 | Ecomoto et al. | |
| 2002/0136946 A1 | 9/2002 | Amatucci et al. | |
| 2003/0013009 A1 | 1/2003 | Dansui et al. | |
| 2004/0038123 A1 | 2/2004 | Hisamitsu et al. | |
| 2005/0089751 A1 | 4/2005 | Oogami et al. | |
| 2005/0214638 A1 | 9/2005 | Asahina et al. | |
| 2005/0285563 A1 * | 12/2005 | Yoneda | 320/112 |
| 2006/0057433 A1 | 3/2006 | Ando et al. | |
| 2006/0121342 A1 | 6/2006 | Sano et al. | |
| 2006/0188776 A1 | 8/2006 | Aker et al. | |
| 2007/0015047 A1 | 1/2007 | Hosaka et al. | |
| 2007/0026739 A1 | 2/2007 | Kim et al. | |
| 2007/0128472 A1 | 6/2007 | Tierney | |
| 2007/0158574 A1 | 7/2007 | Petrillo et al. | |
| 2008/0070102 A1 | 3/2008 | Watanabe | |

(Continued)

FOREIGN PATENT DOCUMENTS

WO WO 2007086495 A1 8/2007

OTHER PUBLICATIONS

International Search Report from PCT/US2009/001791.

(Continued)

*Primary Examiner* — Arun Williams
(74) *Attorney, Agent, or Firm* — Davidson, Davidson & Kappel, LLC (57) ABSTRACT

A vehicle charging station is provided. The vehicle charging station includes a charging source providing an electrical charge, a coolant source providing coolant and a connector having both an electrical supply section delivering the electrical charge and a coolant supply section delivering the coolant. The connector is capable of connecting to a vehicle. A connector for a vehicle charging station and an electric vehicle are also provided.

19 Claims, 8 Drawing Sheets

U.S. PATENT DOCUMENTS

| | | |
|---|---|---|
| 2008/0070106 A1 | 3/2008 | Hock et al. |
| 2009/0239130 A1 | 9/2009 | Culver et al. |
| 2009/0256523 A1* | 10/2009 | Taguchi ................ 320/109 |
| 2009/0305125 A1 | 12/2009 | Kosugi et al. |
| 2010/0104927 A1 | 4/2010 | Albright |
| 2010/0167116 A1 | 7/2010 | Okada |
| 2010/0273044 A1 | 10/2010 | Culver et al. |
| 2010/0315040 A1* | 12/2010 | Sakurai ................ 320/109 |
| 2012/0043943 A1 | 2/2012 | Dyer et al. |

OTHER PUBLICATIONS

International Search Report from PCT/US2010/001248.

* cited by examiner

STATION FOR RAPIDLY CHARGING AN ELECTRIC VEHICLE BATTERY

The present invention relates generally to electric vehicle battery charging and more specifically to a station and method for charging electric vehicle batteries.

BACKGROUND OF INVENTION

There are many obstacles in developing a pure electric vehicle—an electric vehicle running solely on an electric vehicle battery, as opposed to a hybrid electric vehicle that also includes an internal combustion engine—having mass market appeal. One such obstacle is overcoming "range anxiety," which is the fear that the electric vehicle battery will run out of charge before the vehicle reaches its destination. Actual range varies with driver operation and frequently has been found to be worryingly less than expected, especially in heavily populated areas where traffic speed is variable, while the demands on the battery from non-motive peripherals are constant (air conditioning, heating, lighting, etc. . . . ). This varying range prevents electric vehicle users from accurately planning the actual transportation range of their electric vehicles even if the users know the percentage that the electric battery is charged at the beginning of a trip. In order to reduce range anxiety, attempts have been made to extend the range of the vehicle (i.e., "range extension") by increasing the amount of battery energy per vehicle. However, increasing the amount of battery energy per vehicle has been limited by the slow progress in the increase of practical energy density in large electric vehicle batteries. Additionally, although the use of hybrid electric vehicles reduces range anxiety, the use of electric and combustion drive systems together increases costs and does not fulfill the broader objectives for zero emissions and zero petroleum consumption.

BRIEF SUMMARY OF THE INVENTION

A vehicle charging station is provided. The vehicle charging station includes a charging source providing an electrical charge, a coolant source providing coolant and a connector having both an electrical supply section delivering the electrical charge and a coolant supply section delivering the coolant. The connector is capable of connecting to a vehicle.

A connector for a vehicle charging station is also provided. The connector includes an electrical supply section delivering the electrical charge and a coolant supply section delivering the coolant. The connector is capable of connecting to a vehicle.

An electric vehicle is also provided. The electric vehicle includes an electric battery powering a drive system of the vehicle, a charging connector receptacle, a coolant conduit between the electric battery and the receptacle and an electrical power connection between the electrical battery and the receptacle.

BRIEF DESCRIPTION OF THE DRAWINGS

The present invention is described below by reference to the following drawings, in which:

FIG. 5a shows an axial view of a receptacle according to one embodiment of the present invention for connection with the connector shown in FIG. 3a;

FIG. 5b shows an axial view of a receptacle according to one embodiment of the present invention for connection with the connector shown in FIG. 3b;

FIG. 6a shows an axial view of a receptacle according to one embodiment of the present invention for connection with the connector shown in FIG. 4a;

DETAILED DESCRIPTION

Because the predictable range of an electric vehicle is difficult to determine and because increasing the practical energy density in large electric vehicle batteries is progressing slowly, increasing the availability of rapid roadside charging may encourage acceptance of pure electric vehicles. Roadside as used herein is defined as being any location that is accessible off a public roadway. For example, all gas stations accessible to the public are considered as being roadside according to the definition of roadside used herein. Combining the availability of rapid roadside charging with overnight charging, which itself does not reduce range anxiety because it does not extend the range of a vehicle in transit, may further increase the convenience and appeal of pure electric vehicles. Broader acceptance of pure electric vehicles may achieve economies of scale that may make electric vehicles and the underlying energy used to charge electric vehicle batteries dramatically less costly than conventional internal combustion drive vehicles or hybrid electric vehicles.

Embodiments of the present invention provide high power DC electric supply roadside charging stations capable of delivering up to 300 kW per electric vehicle (e.g., for 6 minutes charging of a 30 kWh electric vehicle battery) or more together with a coolant for cooling the electric vehicle battery during charging so that the battery does not overheat (up to ~50 kW of heat for example may be expected to be generated during 6 to 12 minutes of charge time). Conventional cooling techniques, such as cooling the surface or exterior of high voltage electric batteries, may not efficiently cool the heat generated by rapid charging stations delivering up to 300 kW or more per electric vehicle. Because heat generated by charging is primarily generated internally within the electric vehicle battery, cooling the external surface of the electric vehicle battery is inefficient and high temperature gradients within the battery stack itself may lead to battery damage and early failure due to an undesirable rise in temperature, increasing costs and the likelihood of dangerous thermal runaway of the battery.

Further, embodiments of the present invention may allow for an efficient and safe method of internal battery stack cooling during high rate charging and may provide a unique and highly effective universal thermal management system. Additionally, the embodiments only add minimal onboard volume and weight to electric vehicles because the coolant and an optional heat exchanger are external to the electric vehicle and are applied during charging. In contrast to electric vehicles that exclusively use onboard cooling systems, having a coolant supply and heat exchanger external to the electric vehicle may increase the range of an electric vehicle and help diminish range anxiety.

Advantageously, an existing onboard coolant system may be modified to provide connections to the external coolant supply of the recharging stations of the present invention.

Figure 1A:
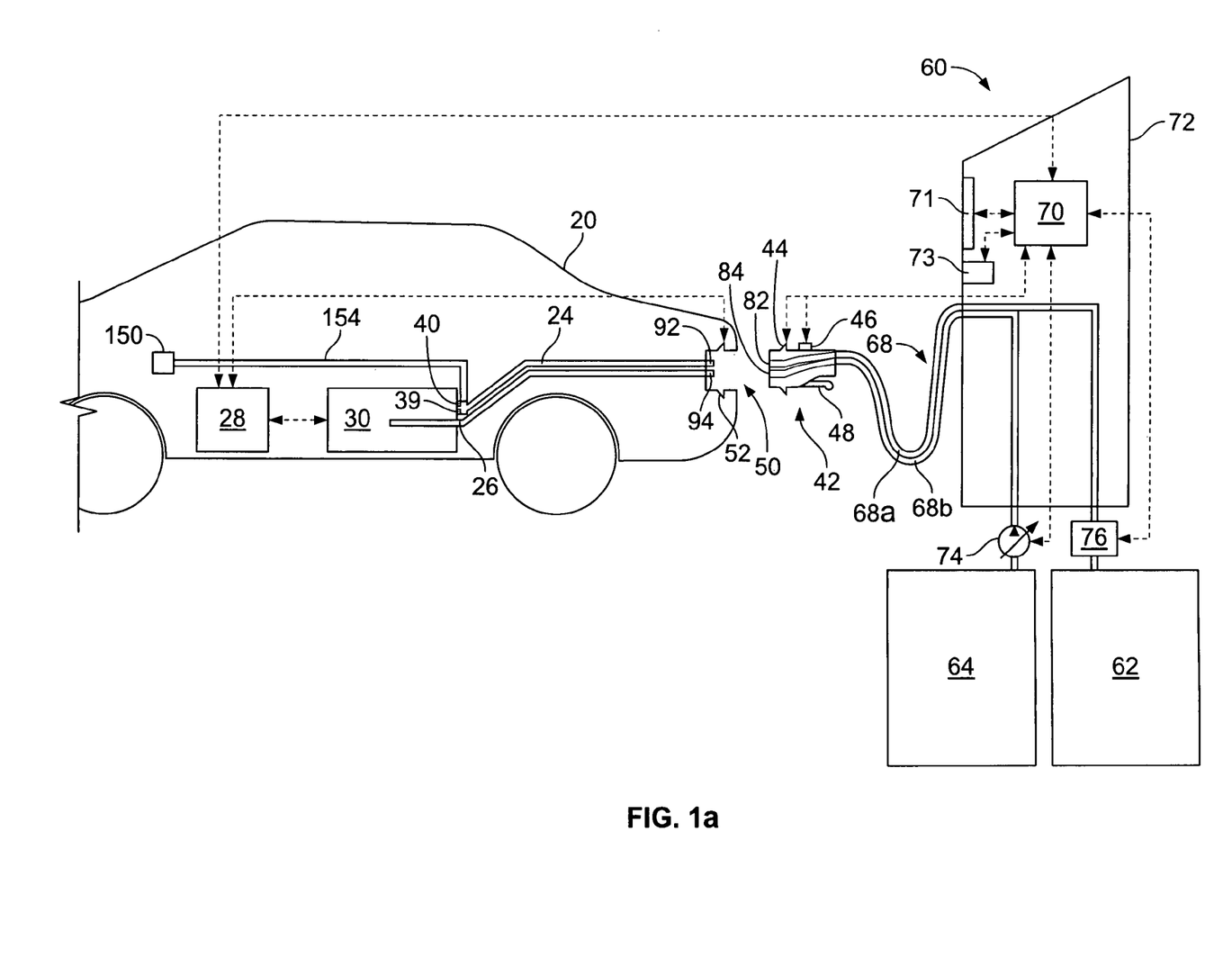
FIG. 1a schematically shows a rapid charging station for charging an electric vehicle according to an embodiment of the present invention.

FIG. 1a schematically shows rapid charging station 60 for charging an electric vehicle 20 according to an embodiment of the present invention. In a preferred embodiment, electric vehicle 20 is for example the electric vehicle disclosed in copending application identified by Ser. No. 13/190,235, entitled RAPID CHARGING ELECTRIC VEHICLE AND METHOD AND APPARATUS FOR RAPID CHARGING, filed on the same date as the present application, the entire disclosure of which is also hereby incorporated by reference herein. For example, electric vehicle 20 may be charged according to the methods disclosed in copending application identified by Ser. No. 13/190,197, entitled SYSTEM AND METHOD FOR RECHARGING ELECTRIC VEHICLE BATTERIES, filed on the same date as the present application, the entire disclosure of which is also hereby incorporated by reference herein. In the preferred embodiment of the present invention, electric vehicle 20 is a pure electric vehicle including an electric vehicle battery 30, but not an internal combustion engine, powering a drive system of vehicle 20. In an alternative embodiment, electric vehicle 20 may be a hybrid electric vehicle and may include an internal combustion engine working in cooperation with electric vehicle battery 30. Vehicle 20 may include a controller 28 coupled to electric vehicle battery 30 for determining the state of battery 30 and for regulating the operation and charging of battery 30 accordingly.

Figure 2:
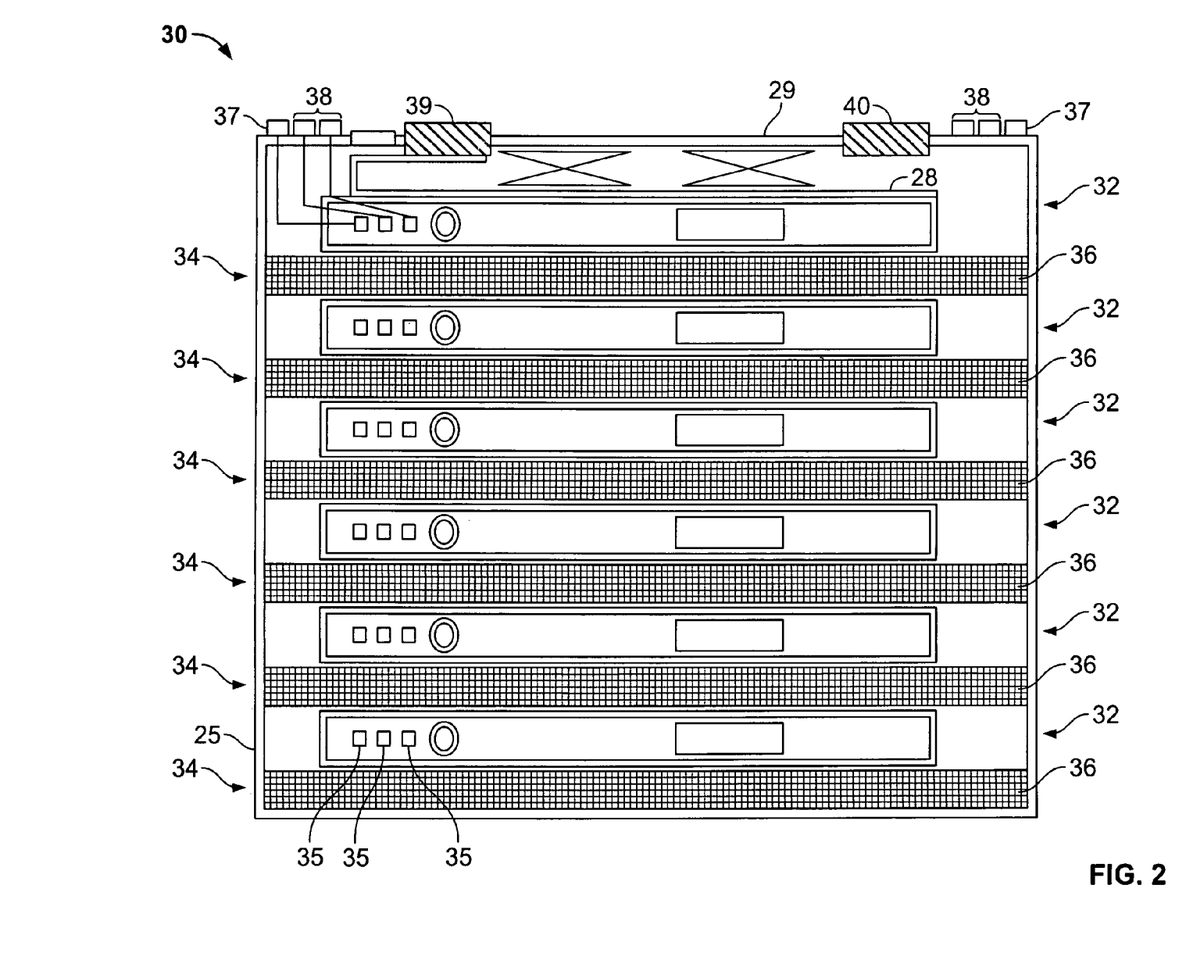
FIG. 2 shows one exemplary embodiment of an electric vehicle battery.

FIG. 2 shows one exemplary embodiment of electric vehicle battery 30 in more detail. Electric vehicle battery 30 may be a modular battery including a plurality of battery cells 32 separated by a plurality of internal channels 34 in battery 30 in between cells 32. Channels 34 are preferably at least partially filled with porous compressible interconnectors 36, which act to provide an electrically-conducting interconnection between adjacent cells 32 while also allowing coolant to be passed through internal channels 34 between cells 32 to cool cells 32 during charging. In preferred embodiments, battery 30 is the battery disclosed in U.S. Pub. No. 2009/0239130, which is hereby incorporated by reference herein, with interconnectors 36 and cells 32 being formed in the same manner as the interconnectors and the planar cell modules, respectively, disclosed in U.S. Pub. No. 2009/0239130. Cells 32 each include a positive and a negative electrode, with the positive electrodes connecting to a positive terminal 39 and the negative electrodes connecting to a negative terminal 40.

Compressible interconnectors 36 may be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces while maintaining sufficient spacing for coolant to be passed through internal channels 34 to cool cells 32 during charging. In the illustrative example in FIG. 2, six cells 32 are contained in a stacked array within an enclosure 25 which, in this embodiment, is of rectangular cross section. Although only six cells 32 are shown, battery 30 may include tens to hundreds of cells interconnected to make a very high-voltage battery stack. Enclosure 25 includes inputs and outputs, which may be automatically opened or closed, allowing coolant to be passed through channels 34.

In alternative embodiments, interconnectors 36 may not be electrically and/or thermally conductive, but may simply be provided between cells 32 to space cells 32 apart from each other to form channels 34 between cells. In these embodiments, cells 32 may be formed as insulating pouches with conductive tabs at the ends thereof which allow coolant passing through channels 34 formed by interconnectors 36 to cool cells 32.

The power terminals 39, 40 connect internally to the ends of the cell module battery stack through an internal power bus 31 for the positive terminal 39 and electrically conductive enclosure 25 may serves as a negative bus 29 to negative terminal 40 or a negative bus may additionally be provided for negative terminal 40. Enclosure 25 may provided with external multipin connectors 37, 38, which may be electrically connected by sense lines to electrical feed throughs 35, for monitoring cell voltage and cell temperature, respectively. One set of multipin connectors 37, 38 may be provided for each cell 32. In order to provide cell voltage and cell temperature information for controlling the charging of battery 30, multipin connectors 37, 38 may transmit voltage and cell temperature measurements to controller 28 (FIG. 1a).

Referring back to FIG. 1a, rapid charging station 60 may include a high power charging source 62 for rapidly charging battery 30 of vehicle 20 and a coolant source 64 for supplying coolant internally to battery 30 via channels 34 (FIG. 2) as battery 30 is rapidly charged by high power charging source 62, which in a preferred embodiment is a high powered DC power source. In preferred embodiments, high power charging source 62 may be a battery or super capacitor capable of discharging at high rates and being recharged with off-peak electricity, which is cheaper and less likely to cause power grid disruptions. The driver of vehicle 20 may pull into rapid charging station 60, turn off vehicle 20 and insert a connector 42 on an end of a supply line 68 of rapid charging station 60 into a corresponding receptacle 50 of vehicle 20 that is accessible from the outside of vehicle 20. In the embodiment shown in FIG. 1a, supply line 68 extends outside of a base portion 72 and includes an electrical supply line 68a, which may be a cable, coupled to high power charging source 62 and a coolant supply line 68b, which may be a hose, coupled to coolant source 64. The driver may insert connector 42 into receptacle 50 of vehicle 20 such that connector 42 is temporarily locked into place in receptacle 50. Receptacle 50 may include one or more grooves 52 formed therein for receiving a corresponding number of protrusions 44 extending radially from connector 42. Protrusions 44 may be spring loaded with respect to connector 42 and may be forced to retract radially into connector 42 via contact with the outside of receptacle 50 and then actuate radially outward into grooves 52 once connector 42 is in receptacle 50. Protrusions may also be retracted via the driver pushing a locking/unlocking actuator 46, which in this embodiment is a push button on connector 42, and once connector 42 is inserted in receptacle 50, actuator 46 may be released so protrusions 44 enter into grooves 52. After connector 42 is locked in place in receptacle 50, with protrusions 44 cooperating with grooves 52 to prevent connector 42 from being pulled out of receptacle 50, the driver may activate a charging/cooling actuator, which in this embodiment is in the form of a handle 48 that may be gripped and squeezed toward connector 42 to begin the flow of current from high power energy source 62 and the flow of coolant from coolant source 64 into battery 30.

In this embodiment, in order to charge battery 30 during extended periods of nonuse, vehicle 20 includes a separate receptacle 150 for coupling to a charger that is plugged into a standard 120 volt or 240 volt AC electrical outlet present in a garage of a home or any other residence or business for overnight charging in order to fully or partially charge electric vehicle battery 30. A charging cord extending from the charger to battery 30 may be detachably coupled to an electric conduit 154 via receptacle 150 in order to fully or partially charge electric vehicle battery 30. Due to the limited rate at which battery 30 may be charged by a standard 120 volt or 240 volt AC electrical outlet, providing external coolant into battery 30 during charging via a standard 120 volt or 240 volt AC electrical outlet is not necessary.

A controller 70 may be provided for controlling the amount of charge supplied to battery 30 from high power charging source 62 and to control the amount of coolant supplied to battery 30 from coolant source 64 (and back into coolant source 64 in embodiments where the coolant is recycled). As vehicle 20 is connected to rapid charging station 60 for charging battery 30, controller 70 may be brought into communication with controller 28 of battery 30 such that controller 70 may regulate the supply of electrical charge from high power charging source 62 and the supply of coolant from coolant source 64 according to the present state of battery 30. For example, if due to the weather conditions or the manner in which vehicle 20 has been driven, battery 30 is warmer or cooler than usual (for example as measured by connectors 37, 38 shown in FIG. 2), the supply of coolant from coolant source 64 may be increased or decreased accordingly. Also, if battery 30 is partially charged and only needs to be charged a small amount, controller 70 may limit the supply of electrical charge from high power charging source 62 to below the maximum charging rate and adjust the flow rate of coolant from coolant source 64 to a corresponding value. Controller 70 may include a memory that correlates the amount of coolant to be supplied to the charge supplied and also optionally to the temperature of battery 30. Controller 28 may also provide controller 70 with information regarding the present chemistry of battery 30, as sensed at battery 30, and controller 70 may control the charging and cooling of battery 30 based on the chemistry of battery 30 to allow for the safest protocols for recharging battery 30. For example, an older battery 30 may not take the fastest recharging rates or may have a slightly different chemistry and may be charged by rapid charging station 60 according to preset chemistry charging and cooling rates stored in controller 70.

Controller 70 may also be a coupled to a touchscreen 71 and a credit card receptacle 73. Along with displaying the amount owed by the vehicle owner on touchscreen 71, controller 70 may also provide information to an operator of roadside charging station 60 for charging the amount owed to the vehicle owner, for example in calculating the charge delivered and the price to be charged for the roadside recharging. Touchscreen 71 may present the driver with charging/cooling and payment options and controller 70 may control the supply of coolant and charge according to the driver's selections. A driver may insert a credit or debit card into credit card receptacle 73 and a processor in controller 70 may process the payment.

After rapid charging station 60 is instructed to begin charging, rapid charging station 60 provides current from high power charging source 62 and coolant from coolant source 64 to battery 30 until battery 30 is sufficiently charged. Coolant is pumped by a pump 74 through coolant supply line 68*b*. The coolant exits coolant supply line 68*b* at a coolant supply section 84 in connector 42 and enters into a coolant supply conduit 26 in vehicle 20 at a coolant inflow section 94 in receptacle 50. Coolant supply conduit 26 is coupled to the inputs of channels 34 (FIG. 2) and supplies coolant to battery 30. Current is sent from high power energy source 62 by a power feeding apparatus 76 through electrical supply line 68*a*. The current exits electrical supply line 68*a* at an electrical supply section 82 in connector 42 and enters into an electrical conduit 24 in vehicle 20 at an electrical inflow section 92 in receptacle 50. In this embodiment connector 42 is formed as a housing that includes both electrical supply section 82 and coolant supply section 84. Electrical conduit 24 in vehicle 20 supplies the current to terminals 39, 40 to charge battery 30. In order to prevent connector 42 from being removed from receptacle 50 while current and coolant are being supplied into vehicle 20, protrusions 44 are prevented from being retracted into connector 42 during charging. Connector 42 may also include spring loaded couplings at or near coolant supply section 84 that allow for quick sealing of supply section 84 during the removal of connector 42 from receptacle 50 to prevent coolant leakage.

In another embodiment, the actuation of protrusions 44 and/or an additional locking mechanism may be controlled by controller 70. For example, after connector 42 is inserted into receptacle 50, controller 70 may direct actuators coupled to protrusions 44 to lock protrusions 44 into grooves 52 or to slide the additional locking mechanism into a locking position before charging and cooling may begin. Then, after charging and cooling is complete, controller 70 may direct actuators coupled to protrusions 44 to unlock protrusions 44 from grooves 52 or to slide the additional locking mechanism into an unlocking position.

In order to ensure that coolant supply section 84 and coolant inflow section 94 are sufficiently coupled together to prevent coolant leakage, a pre-test for integrity and leak-tightness of the coolant connections, for example by air pressure, may be performed before coolant is output from connector 42 into receptacle 50.

Figure 1B:
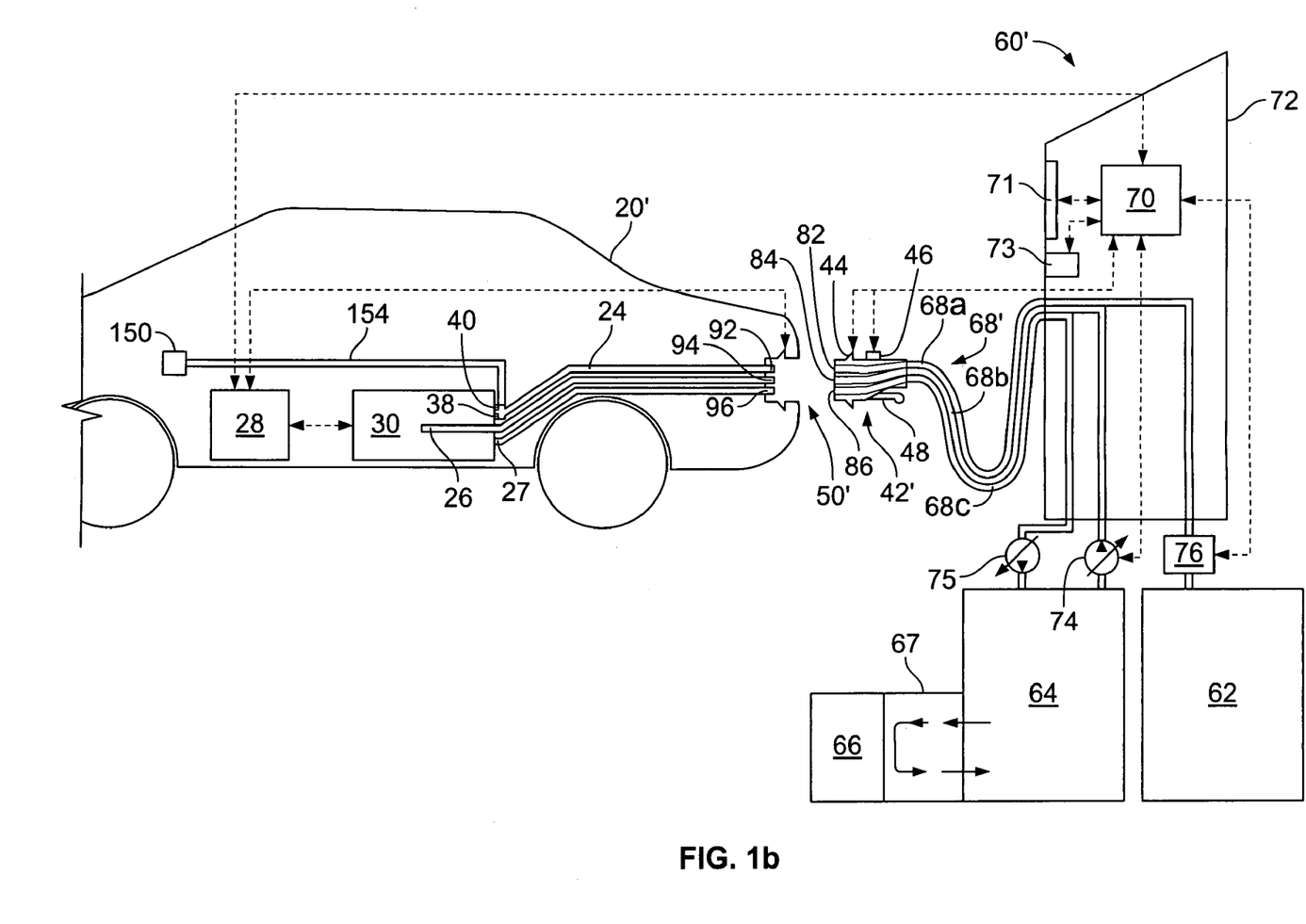
FIG. 1b schematically shows an alternative embodiment of a rapid charging station for charging an electric vehicle.

FIG. 1*b* schematically shows an alternative embodiment of a rapid charging station 60' for charging an electric vehicle 20'. Rapid charging station 60' and vehicle 20' are configured to operate in the same manner as rapid charging station 60 and vehicle 20 as described herein, but are configured for recycling coolant back into coolant source 64 during charging. Accordingly, all of the reference numbers shown in FIG. 1*b*, if not discussed, refer to the same components as discussed with respect to FIG. 1*a*. After coolant passes through battery 30 and exits outlets of channels 34 (FIG. 2), the heated coolant enters into a coolant return conduit 27 coupled to the outlets of channels 34. The heated coolant then is pumped out of a coolant outflow section 96 in receptacle 50 into a coolant return section 86 in a connector 42' and through a return line 68*c* into coolant source 64 by a return pump 75. The heated coolant is forced through a heat exchanger 67 that is coupled to a refrigeration unit 66 to cool the heated coolant for reuse. After the coolant is sufficiently cooled the coolant may be pumped from coolant source 64 via pump 74 back into vehicle 20 for further cooling of battery 30. In order to prevent connector 42 from being removed from receptacle 50 before coolant is recycled back into connector 42, connector 42 may include a sensor in communication with controller 70 such that controller may prevent protrusions 44 from being retracted while coolant is being passed from coolant outflow section 96 to coolant return section 86.

In alternative embodiments, connector 42 or 42' may be robotically operated automatically by controller 70 of rapid charging station 60 or 60', instead of connector 42 or 42' being manually operated by a driver of vehicle 20 or 20'. A robotic arm may extend from base portion 72 and may include sensors for locating receptacle 50 or 50'. A user may activate the robotic arm for example by inserting a card into credit card receptacle 73 or by interaction with touchscreen 71 and the robotic arm may insert connector 42 or 42' into receptacle 50 or 50'. After connector 42 or 42' is inserted into receptacle 50 by the robotic arm, controller 70 may direct actuators coupled to protrusions 44 to lock protrusions 44 into grooves 52 or to slide an additional locking mechanism into a locking position before charging and cooling may begin.

Figure 3A:
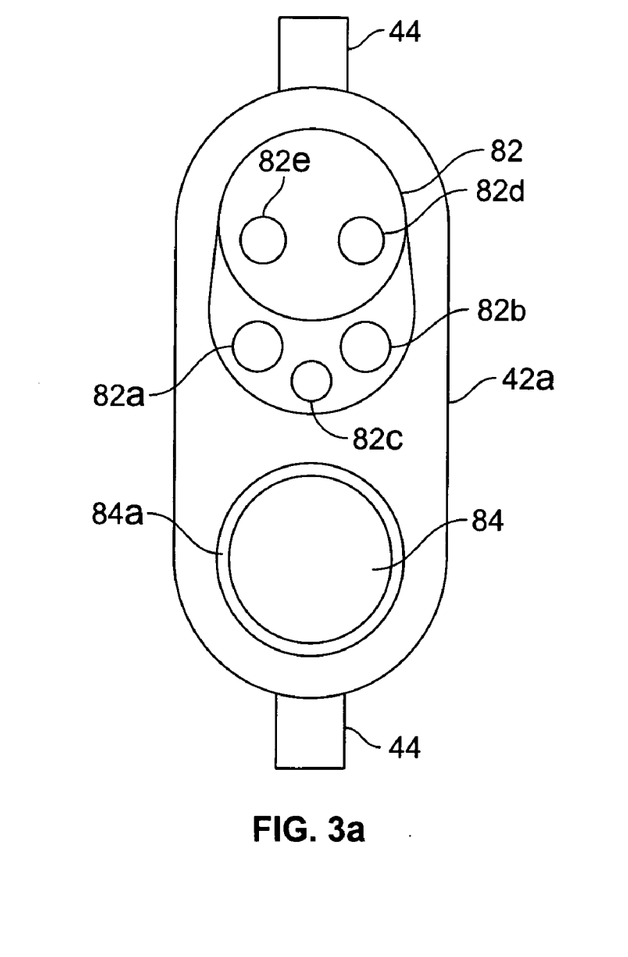
FIG. 3a shows an axial view of a connector according to one embodiment of the present invention.

FIG. 3a shows an axial view of a connector 42a according to one embodiment of the present invention. Connector 42a includes electrical supply section 82 and coolant supply section 84 in vertical alignment with one another. In this embodiment, electrical supply section 82 includes five pins—two DC power supply pins 82a, 82b, an electrical ground pin 82c, a detection pin 82d, a control pin 82e. Coolant supply section 84 includes at least one level of seals 84a circumferentially surrounding the edge thereof. Connector 42a also includes two locking protrusions 44 extending from the top and bottom edges thereof for insertion into grooves in a corresponding vehicle receptacle.

Figure 3B:
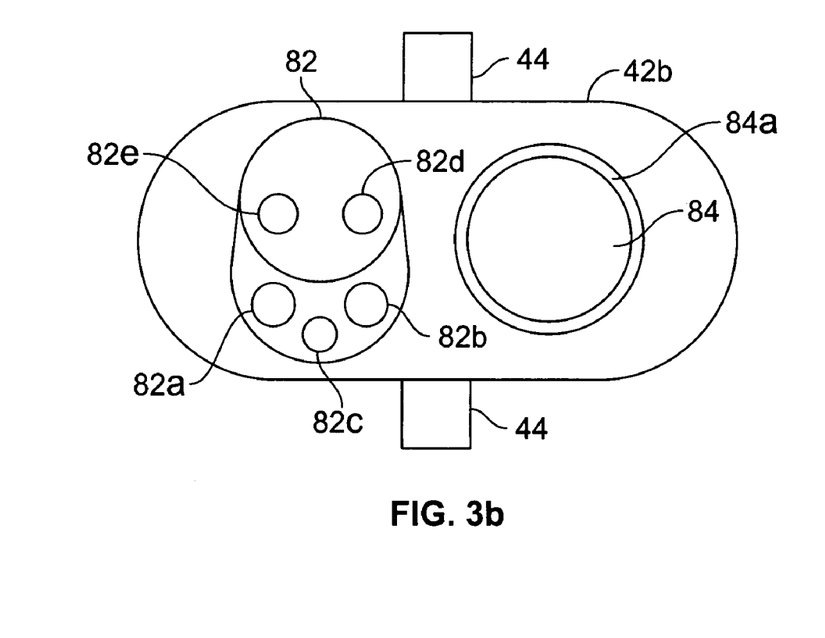
FIG. 3b shows an axial view of a connector according to another embodiment of the present invention.

FIG. 3b shows an axial view of a connector 42b according to another embodiment of the present invention. Connector 42b is constructed in the same manner as connector 42a, including electrical supply section 82 and coolant supply section 84; however, sections 82, 84 are horizontally aligned with one another. Two locking protrusions 44 extend from the top and bottom edges of connector 42b for insertion into grooves in a corresponding vehicle receptacle.

Figure 4A:
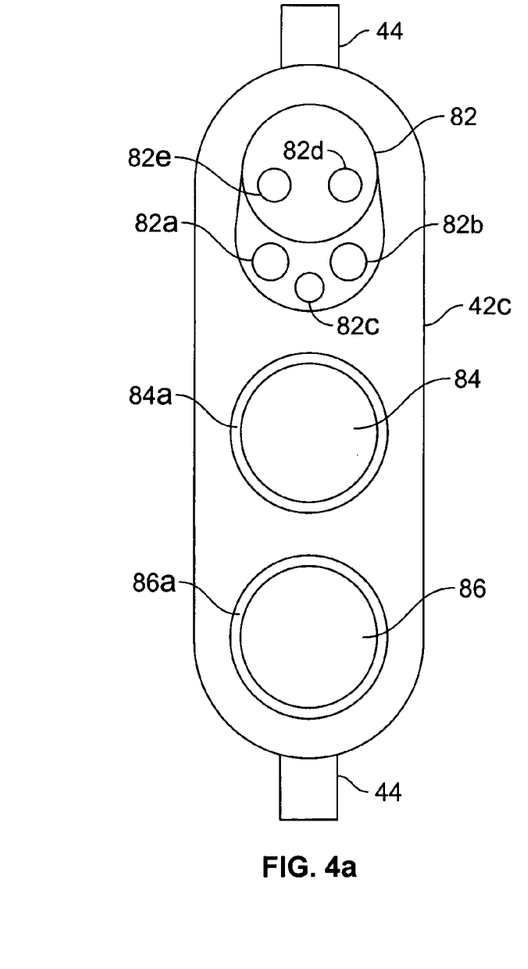
FIG. 4a shows an axial view of a connector including a coolant return section according to an embodiment of the present invention.

FIG. 4a shows an axial view of a connector 42c according to another embodiment of the present invention. Connector 42c is constructed in the same manner as connector 42a, including electrical supply section 82 and coolant supply section 84; however, connector 42c includes a coolant return section 86 vertically aligned with sections 82, 84 for receiving coolant that has been passed through battery 30 and is being recycled back into coolant source 64. Coolant return section 86 also includes at least one level of seals 86a circumferentially surrounding the edge thereof.

Figure 4B:
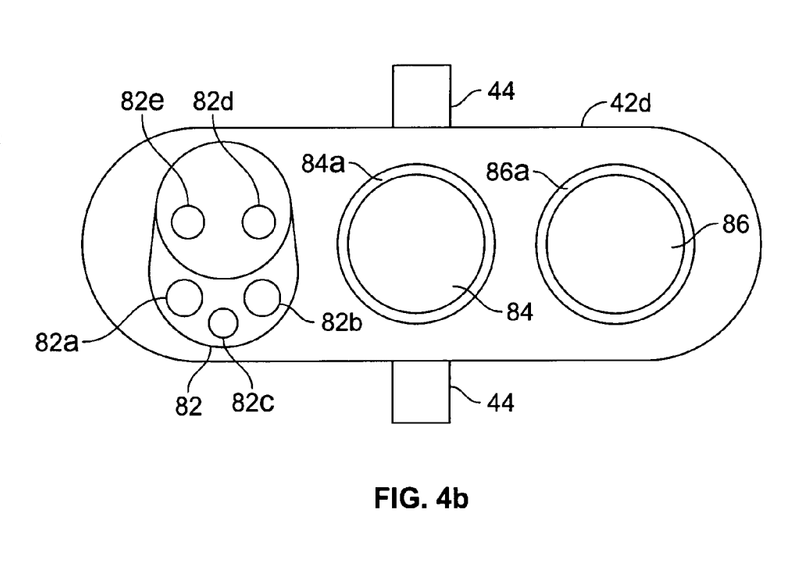
FIG. 4b shows an axial view of a connector including a coolant return section according to another embodiment of the present invention.

FIG. 4b shows an axial view of a connector 42b according to another embodiment of the present invention. Connector 42b is constructed in the same manner as connector 42c, including electrical supply section 82, coolant supply section 84 and coolant return section 86; however, sections 82, 84, 86 are horizontally aligned with one another.

Figures 5A, 5B:
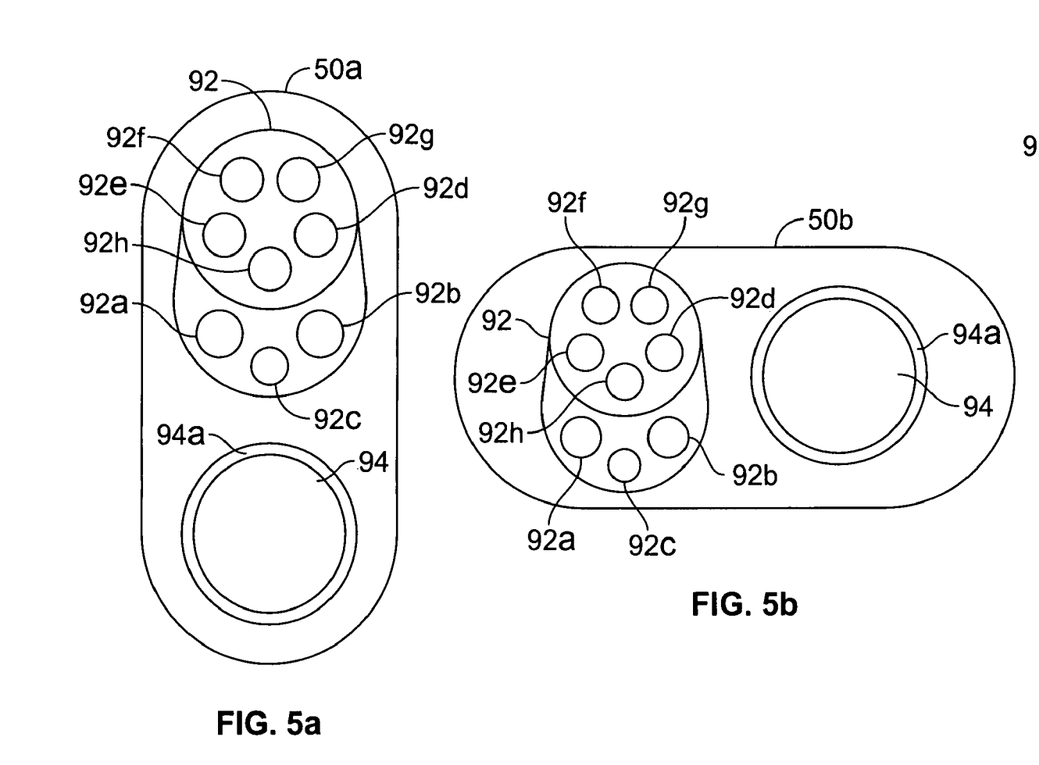

FIG. 5a shows an axial view of a receptacle 50a according to one embodiment of the present invention. Receptacle 50a includes electrical inflow section 92 and coolant inflow section 94 in vertical alignment with one another. In this embodiment, electrical inflow section 92 includes seven contacts—two DC power contacts 92a, 92b, an electrical ground contact 92c, a detection contact 92d, a control contact 92e, two AC power contacts 92f, 92g and an additional ground contact 92h. Coolant inflow section 94 includes at least one level of seals 94a circumferentially surrounding the edge thereof. Connector 42a shown in FIG. 3a may be inserted into receptacle 50a for rapidly charging battery 30 (FIGS. 1a, 1b and 2), such that DC power supply pins 82a, 82b are directly connected to DC power contacts 92a, 92b, electric ground pin 82c is directly connected to ground contact 92c, detection pin 82d is directly connected to detection contact 92d, control pin 82e is directly connected to control contact 92e and coolant supply section 84 is sealingly connected to coolant inflow section 94. In this embodiment, in order to charge battery 30 during extended periods of nonuse, AC power contacts 92f, 92g and ground contact 92h may be coupled to for example a SAE J1772 Level 1 or Level 2 AC charger that is plugged into a standard 120 volt or 240 volt AC electrical outlet present in a garage of a home or any other residence or business for overnight charging in order to fully or partially charge electric vehicle battery 30. A charging cord extending from the charger to battery 30 may be detachably coupled to electric conduit 24 via electrical inflow section 92 in order to the fully or partially charge electric vehicle battery 30. Due to the limited rate at which battery 30 may be charged by a standard 120 volt or 240 volt AC electrical outlet, providing external coolant into battery 30 during charging via a standard 120 volt or 240 volt AC electrical outlet is not necessary. In other embodiments of the present invention, vehicle 20 or 20' may include a separate receptacle 150 (FIGS. 1a, 1b) for receiving DC power from an external charger connected to a standard 120 volt or 240 volt AC electrical outlet or for receiving AC power for connection to an onboard DC battery charger and receptacle 50 (FIGS. 1a, 1b) may not include AC power contacts.

In a preferred embodiment, control contact 92e is a data-bus connection in conformance with the automotive standard, which is "controlled area network" (CAN), per ISO 11898-2, requiring control contact 92e to include three separate pins (high/low/ground). The CAN communicates between controllers 28, 70 to establish a dialog between controllers 28, 70 for effectively charging and cooling battery 30.

Referring to FIGS. 1, 3a and 5a, as soon as connector 42a is inserted into receptacle 50a, detection pin 82d and detection contact 92d may alert controller 70 of rapid charging station 60 and controller 28 of vehicle 20 that rapid charging station 60 and vehicle 20 are coupled together for charging. In one embodiment of the present invention, grooves 52 and protrusions 44 may include contacts that are electrically coupled to controllers 28, 70, respectively, to notify controllers 28, 70 that connector 42 is locked securely in place inside of receptacle 50. Controller 70 of rapid charging station 60 may then begin communicating with controller 28 of vehicle 20 via control pin 82e and control contact 92e to establish charging parameters for charging via DC power supply pins 82a, 82b and cooling parameters for supplying coolant from coolant source 62. At least one of controller 28 and controller 70 then sets the charging and cooling parameters and controller 70 accordingly instructs power feeding apparatus 76 to begin supplying current from high power charging source 62 to battery 30 and coolant pump 74 to begin pumping coolant from coolant source 64 to battery 30. When battery 30 is sufficiently charged, controller 28 informs controller 70, through control pin 82e and control contact 92e and controller 70 stops the operation of power feeding apparatus 76 and pump 74. Once coolant and current and stop flowing from connector 42 into receptacle 50, protrusions 44 may be released from grooves 52 and actuated inwardly towards connector 42 by pushing locking/unlocking button 46.

FIG. 5b shows an axial view of a receptacle 50b according to another embodiment of the present invention. Receptacle 50b is constructed in the same manner as receptacle 50a, including electrical inflow section 92 and coolant inflow section 94; however, sections 92, 94 are horizontally aligned with one another. Connector 42b shown in FIG. 3b may be inserted into receptacle 50b for rapidly charging battery 30 (FIGS. 1a, 1b and 2), such that DC power supply pins 82a, 82b are directly connected to DC power contacts 92a, 92b, electric ground pin 82c is directly connected to ground contact 92c, detection pin 82d is directly connected to detection contact 92d, control pin 82e is directly connected to control contact 92e and coolant supply section 84 is sealingly connected to coolant inflow section 94.

Figure 5C:
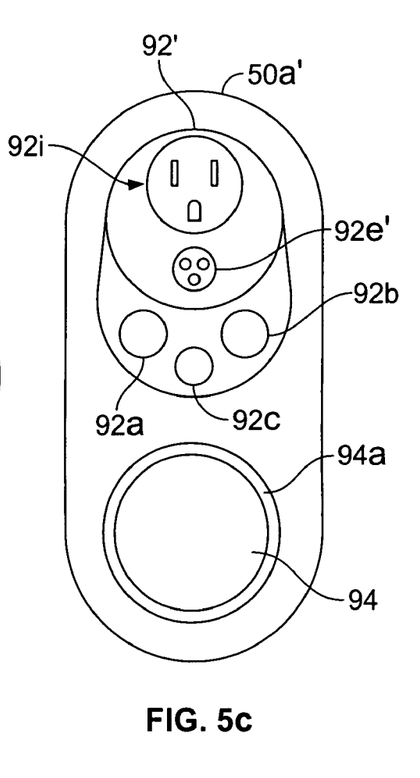
FIG. 5c shows an axial view of a receptacle according to another embodiment of the present invention.

FIG. 5c shows an axial view of a receptacle 50a' according to another embodiment of the present invention. Receptacle 50a' includes coolant inflow section 94 and an electrical inflow section 92' that differs from electrical inflow section 92. Electrical inflow section 92' is constructed in the same manner as receptacle 50a; however, receptacle 50a' includes an electrical inflow section 92' that includes contacts 92a, 92b, 92c for rapid DC charging, a standard socket 92i for receiving a standard two or three pin AC or DC connector plug to charge battery 30 and a control contact 92e' designed according to the ISO 11898-2 standard including three separate pins (high/low/ground). A rapid charging connector for mating with receptacle 50a' and supplying coolant and current through sections 92', 94 preferably covers the entirety of receptacle 50a', including standard socket 92i.

Figure 6A:
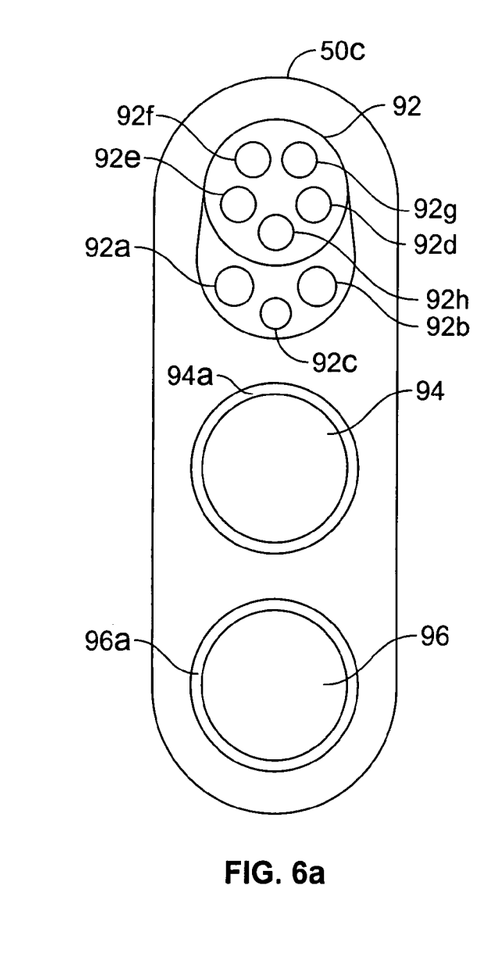

FIG. 6a shows an axial view of a receptacle 50c according to another embodiment of the present invention. Receptacle 50b is constructed in the same manner as receptacle 50a, including electrical inflow section 92 and coolant inflow section 94; however, receptacle 50c includes a coolant outflow section 96 vertically aligned with sections 92, 94 for receiving coolant that has been passed through battery 30 and is being recycled back into coolant source 64. Coolant outflow section 96 also includes at least one level of seals 94a circumferentially surrounding the edge thereof. Connector 42c shown in FIG. 4a may be inserted into receptacle 50c for rapidly charging battery 30 (FIGS. 1a, 1b and 2), such that DC power supply pins 82a, 82b are directly connected to DC power contacts 92a, 92b, electric ground pin 82c is directly connected to ground contact 92c, detection pin 82d is directly connected to detection contact 92d, control pin 82e is directly connected to control contact 92e, coolant supply section 84 is sealingly connected to coolant inflow section 94 and coolant return section 86 is sealingly connected to coolant outflow section 96.

Figure 6B:
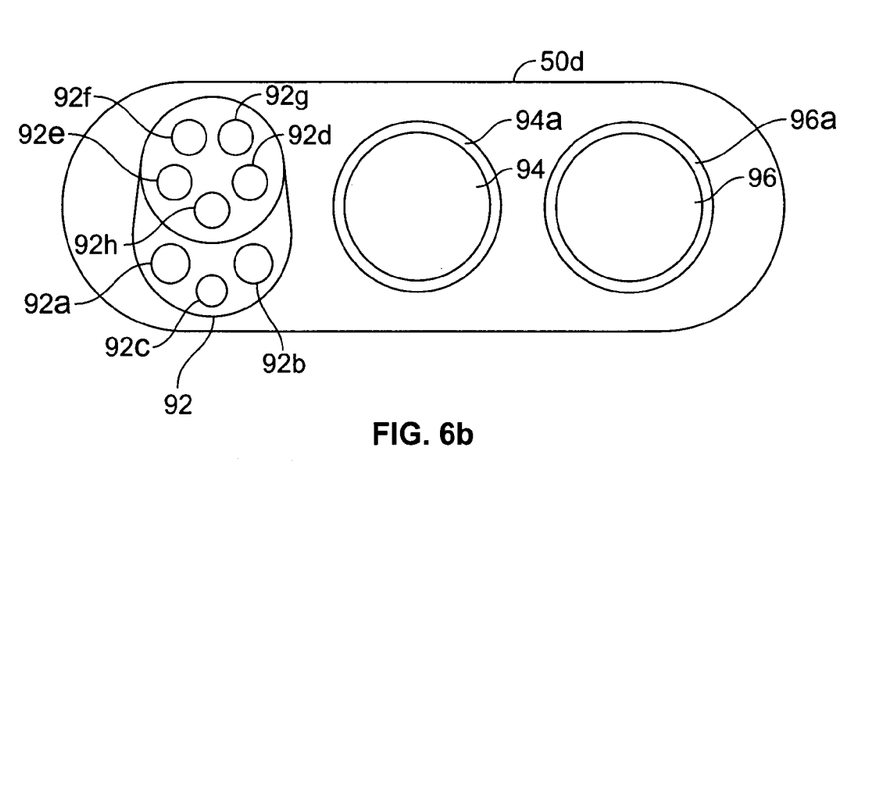
FIG. 6b shows an axial view of a receptacle according to one embodiment of the present invention for connection with the connector shown in FIG. 4b.

FIG. 6b shows an axial view of a receptacle 50d according to another embodiment of the present invention. Receptacle 50d is constructed in the same manner as receptacle 50c, including electrical inflow section 92, coolant inflow section 94 and coolant outflow section 96; however, sections 92, 94, 96 are horizontally aligned with one another. Connector 42d shown in FIG. 4b may be inserted into receptacle 50d for rapidly charging battery 30 (FIGS. 1a, 1b and 2), such that DC power supply pins 82a, 82b are directly connected to DC power contacts 92a, 92b, electric ground pin 82c is directly connected to ground contact 92c, detection pin 82d is directly connected to detection contact 92d, control pin 82e is directly connected to control contact 92e, coolant supply section 84 is sealingly connected to coolant inflow section 94 and coolant return section 86 is sealingly connected to coolant outflow section 96.

In alternative embodiments of receptacles 50a, 50b, 50c, 50d, similar to receptacle 50a', receptacles 50a, 50b, 50c, 50d may also include standard socket 92i, such that a standard two or three AC or DC connector plug may also be plugged into receptacles 50a, 50b, 50c, 50d. Standard socket 92i may replace AC power contacts 92f, 92g and additional ground contact 92h or be added in addition to AC power contacts 92f, 92g and additional ground contact 92h. In embodiments where receptacles 50 are configured for charging via an AC power source, vehicle 20 or 20' may include an on-board AC/DC converter. In further embodiments, receptacles 50 may not include any of AC contacts 92f, 92g, 92h or standard socket 92i and, if AC charging is desired, AC power may be provided through contacts 92a, 92b, 92c and an on-board AC/DC converter in vehicle 20 or 20' may convert current the AC power into DC power to charge battery 30.

Referring back to FIGS. 1a and 1b, in one preferred embodiment of the present invention, rapid charging station 60 or rapid charging station 60' delivers approximately 300 kW to vehicle 20 or vehicle 20' and may accordingly charge a 600 Volt, 30 kWh embodiment of battery 30, in approximately 6 minutes. During the approximately 6 minutes of rapid charging of 30 kWh embodiment of battery 30, approximately 50 kW of heat may be generated by cells 32 of the 30 kWh embodiment of battery 30. Without coolant being provided internally to the 30 kWh embodiment of battery 30 during such rapid charging, battery 30 may become permanently damaged or destroyed. Accordingly, sufficient coolant may be pumped from coolant source 64 through supply line 68 and coolant supply conduit 26 into battery 30 as current is supplied from high power charging source 62 through supply line 68 and electrical conduit 24 to absorb a portion of the heat emitted by battery 30 and prevent battery 30 from being damaged or destroyed during the charging.

In one example, battery 30 is a 300 Volt electric vehicle battery weighing 100 kg and after a full charge may supply 30 kWh to vehicle 20 or vehicle 20'. In this example, high power charging source 62 fully charges battery 30 in ten minutes, at 180 kW and battery 30 includes one hundred 3V cells 32 each having a resistance of 1 milliohm. The charging generates approximately 36 kW of heat for 10 minutes (~6 kWh). In order to sufficiently cool battery 30 during such charging to maintain an acceptable temperature of approximately 45 degrees Celsius, coolant source 64 may provide oil (supplied at 20 degrees Celsius) at a rate of at least 0.73 liters per second (44 liters per minute) or may provide air (supplied at 0 degrees Celsius) at a rate of at least 1800 cubic feet per minute. Across the industry, electric battery charge and discharge rates are referred to using a normalization called a C-rate (C=capacity of the battery). Regardless of the size of electric battery, a 1C rate on charge or discharge means the battery is fully charged or discharged or discharged in 1 hour. For example a C/8 rate would indicate an eight hour charge or discharge and 2C rate would indicate a half hour charge or discharge. Accordingly, for the above example of charging in ten minutes, battery 30 would have a C-rate of 6C.

In another example, to charge a 600 Volt, 24 kWh embodiment of battery battery 30 in six minutes, high power charging source 62 may be a 240 kW charger, delivering 400 Amps at 600 Volts (DC) for six minutes. Due to substantial heat losses, the power delivered may have to be much higher than if the charging was completely efficient. For example, if there were two hundred cells of 3 Volts each, with a resistance each of one milliohm, there may be 32 kW of heat generated, and an additional minute of charging (approximately seven minutes total) may be necessary.

In one embodiment, instead of fully charging battery 30 to 100% of its charge capacity using high power charging source 62, battery 30 may be charged by high power charging source 62 to 80% of its charge capacity in approximately five minutes. This approach of 80% charging may prevent overvoltages in some cells of battery 30. Charging over 80% of the charge capacity of battery 30 may then be accomplished if desirable by tapering down the current supplied by charging source 62 after battery 30 is charged to 80% of its charge capacity. In order to charge the 600 Volt, 24 kWh embodiment of battery 30, after being fully discharged, having two hundred cells of 3 Volts each, with a resistance each of one milliohm, to 80% capacity (19.2 kWh) in five minutes, 2.7 kWh of heat (32 kW over five minutes ~$10^7$ Joules) would be generated in battery 30. In order to sufficiently remove 2.7 kWh of heat in five minutes, oil may be passed internally through channels 34 of battery 30 at a minimum of 40 liters/min or air may be passed internally through channels 34 of battery 30 at a minimum of 1600 cubic ft/min. In order to compensate for the inherent delay in heat transfer to the coolant, in preferred embodiments of the present invention, oil or air is passed through at higher rates than the minimum. In these embodiments, for the above mentioned 600 Volt battery, oil may be passed internally through channels 34 of battery 30 at approximately 50 to 200 liters/min or air may be passed internally through channels 34 of battery 30 at approximately 2000 to 8000 cubic ft/min. The cooling rates for larger or smaller batteries may be proportionately higher or lower, respectively.

In further embodiments, refrigeration unit 66 may be provided in rapid charging station 60 for further cooling the air or oil used to cool battery 30. In particular, refrigeration unit 66 may be particularly advantageous for cooling air and may allow air to be passed internally through channels 34 of battery 30 at rates lower than approximately 2000 to 8000 cubic ft/min.

After battery 30 is charged by rapid charging station 60 or rapid cooling station 60', battery 30 may be internally air-cooled or heated by passing air through interconnectors 36. The air may be may be supplied using blown air from an existing on-board air conditioning or air-heating system (HVAC) on vehicle 20 or vehicle 20'. For instance, air-blown heating may be used during the coldest days of winter months for efficient and rapid battery warm up, which is advantageous because batteries loose considerable capacity (and therefore driving range) at low temperatures. Then, as the battery heats up to the normal operating temperature, any waste heat generated thereafter may be used for space heating or cooling (e.g., via a small heat pump), thereby utilizing otherwise wasted energy (further extending the range of vehicle 20 or vehicle 20') and controlling the rising of the temperature of battery 30 during accelerating and braking transients.

In one embodiment of the present invention, coolant supply conduit 26 and coolant return conduit 27, if provided, may be incorporated into the HVAC system of vehicle 20 or vehicle 20'. Accordingly, coolant supply conduit 26 and coolant return conduit 27 may be used for thermal management of battery 20 to pass coolant through channels 34 (FIG. 2) during the operation of vehicle 20 or vehicle 20' and then for cooling of battery 30 with coolant supplied by rapid charging station 60 or rapid charging station 60' and passed through channels 34 during rapid recharging. Switching valves may be provided to alternately couple the coolant supply conduit 26 and coolant return conduit 27 to the HVAC system during driving and to supply line 68 during charging.

In other embodiments of the present invention, after battery 30 is charged by rapid cooling station 60, battery 30 may be internally liquid-cooled or liquid-heated by passing liquid through interconnectors 36 from an on-board liquid heat-exchanger cooled or heated respectively by an on-board refrigeration or heating system which may also serve to control vehicle space cooling and heating. For example, vehicle 20 or 20' may include an on-board liquid heating and/or cooling system including a liquid circuit for passing liquid coolant internally through channels 34 of battery 30 during the operation of vehicle. In these embodiments, the cooling circuit may be selectively coupled to the input and output of channels 34. For example, switching valves may be provided to alternately couple the coolant supply conduit 26 and coolant return conduit 27 to the liquid circuit during driving and to supply line 68 during rapid charging.

Additionally, for example, the thermal energy removed from battery 30 by the coolant passing through battery 30 may be converted into electricity in either vehicle 20 or rapid charging station 60. For example, turbine or thermoelectric devices of vehicle 20 or vehicle 20' or turbine or thermoelectric devices in rapid charging station 60 or rapid charging station 60' may be coupled to outlets of channels 34 to recapture energy in the coolant downstream of battery 30.

In preferred embodiments, battery 30 contains nanoscale particles which fundamentally allow for high charging rates. The nanoscale particles may be coated with a thin layer of carbon. For example, anodes of cells 32 may be formed of lithium titanium oxide (LTO) nanoparticles and cathodes of cells 32 may be formed of lithium iron phosphate (LFP) nanoparticles, such that battery 30 may be rapidly recharged at up to the 3 minute rate (i.e., 20C-rate) and may also cycle for many thousands of times such that no battery replacement may be required during the life of vehicle 20 or 20'. For example, the use of such nanoparticles in battery 30 when combined with the present invention which limits the temperature rise in battery 30 may allow battery 30 to be rapidly charged more than 10,000 times, and with a range of 100 miles, battery 30 theoretically may have a life of more than 1,000,000 miles. Such battery longevity would yield a high salvage value for battery 30 for example for use in new vehicles. Such battery longevity would also provide environmental and strategic benefits for the United States by reducing battery raw materials importation and processing thereof.

Coolants other than air or oil may also be supplied by coolant source 64. For example, flowable liquid or gaseous materials having optimal heat capacity may used. The coolant may be supplied with additives to increase heat exchange capabilities. In one preferred embodiment, the coolant is electrically insulating.

In additional embodiments, electrical supply section 82 of connector 42 may for example be designed as or similar to a SAE J1772 standard charge coupler, a SAE J1773 standard charge coupler, VDE-AR-E 2623-2-2 standard charge coupler or a CHAdeMO standard charge coupler that is integrated with the coolant supply section 84 (and possibly coolant return section 86) of connector 42 for providing electricity and coolant to battery 30 simultaneously.

In further embodiments of the present invention such electrical supply section 82 may not directly connect to electrical inflow section 92, but electrical supply section 82 may be indirectly coupled to electrical conduit 24, such that high power charging source 62 may wirelessly charge battery 30 through inductive charging or magnetic resonance charging.

Embodiments of the present invention may also be applied to hybrid electric vehicles and other large battery applications benefiting from rapid charging with off-board or external cooling. For example, rapid charging stations may be used for charging and cooling trains, planes, along with military vehicles, including armament and battlefield applications such as large robots, tanks, drones, M777 howitzers and rail guns, etc. . . . , all of which may benefit from the ability of fast battery recharges, with the amount of coolant being supplied being proportional to the size of the battery and the desired speed of the recharge. As used herein, vehicle is defined broadly as encompassing any piece of mechanized equipment.

In further embodiments, which may be particularly useful for military applications, rapid charging stations 60, 60' may be formed as mobile charging stations, so-called mules, that may be moved from one place to another in situations where stationary rapid charging stations may not be accessed. Accordingly, the mobile charging stations may be integral with a vehicle, for example a tank, airplane or truck, may be movable onto a vehicle and/or be movable by a vehicle.

Figure 7:
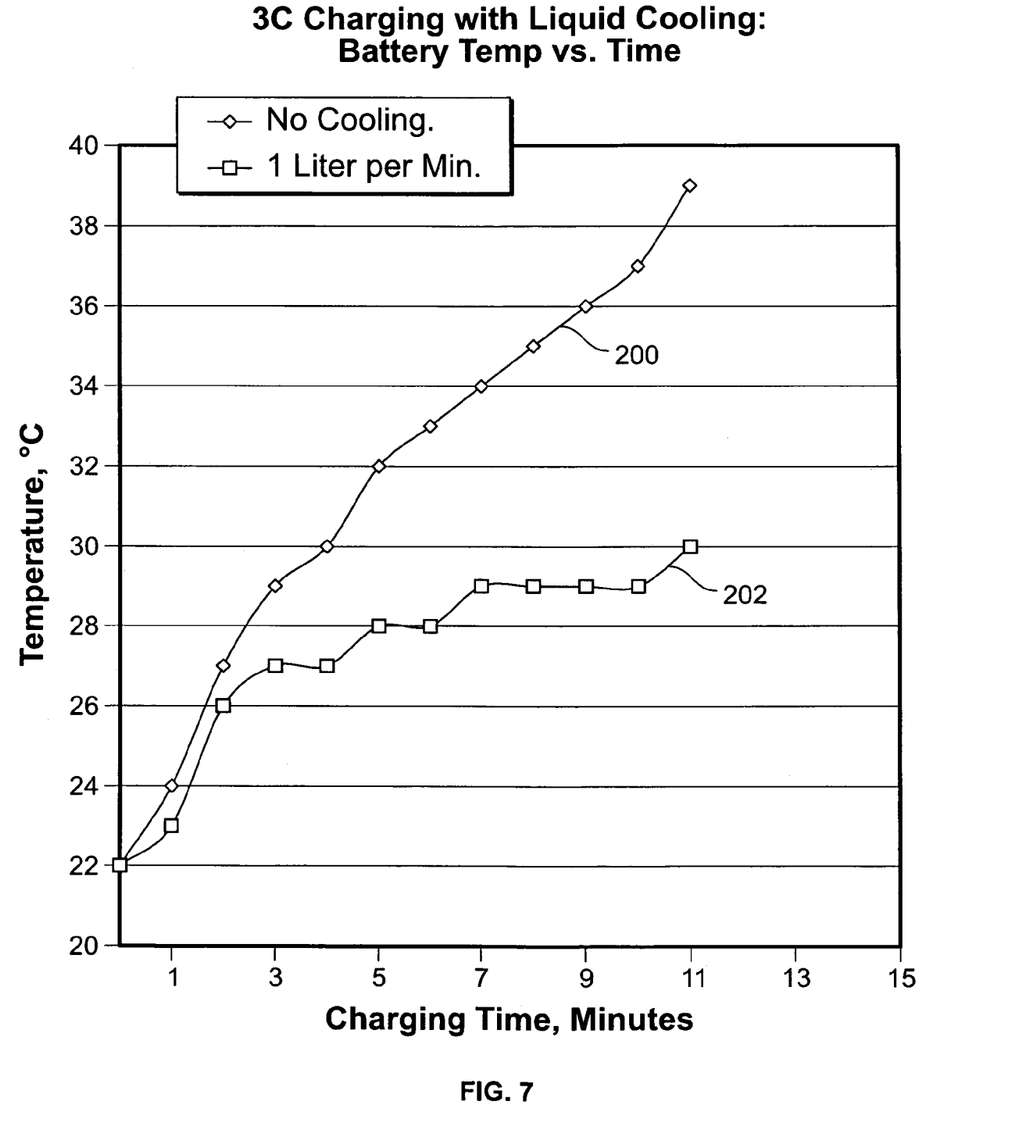
FIG. 7 shows a graph plotting battery temperature versus time for a three cell battery rapidly charged at a 20 minute rate.

FIG. 7 shows a graph plotting battery core temperature versus time for a three cell battery rapidly charged at a 20 minute rate (i.e., 3C-rate). The three cell battery includes electrically conductive interconnectors 36 (FIG. 2) between the cells. A line 200 plots the temperature of the three cell battery versus time without any coolant flowing through interconnectors 36 and a line 202 plots the temperature of the three cell battery versus time with coolant being pumped into the battery, through interconnectors 36, at a rate of one liter per minute. In this experiment, the coolant used was a commercial heat-transfer fluid, Paratherm LR, a paraffinic hydrocarbon with a broad operating range (i.e., between −50 and 230 degrees Celsius). Paratherm LR has a specific resistance of around 10E14 ohm cm, and the dielectric breakdown voltage (per ASTM D1816-04, 0.1 inch gap) is over 22 kV, which was sufficient to prevent damage to the electrical components of the battery for example by electrical shorting which would also cause inefficient charging. The graph illustrates that pumping coolant into a battery limits the temperature of the battery. As shown in FIG. 3, without cooling, the battery is heated from 22 degrees Celsius to 30 degrees Celsius in approximately 4 minutes and is heated to approximately 39 degrees Celsius in approximately 11 minutes. In contrast, with coolant being pumped through the battery, the battery does not reach 30 degrees Celsius until the battery has been heated for 11 minutes. Accordingly, the temperature increase in the cooled battery is less than half of the temperature increase of the uncooled battery (8 degrees Celsius vs. 17 degrees Celsius). Further properties of Paratherm LR are shown in the below chart.

| Chemical name | Paraffinic hydrocarbon |
| --- | --- |
| Maximum Recommended Film Temperature | 500° F./260° C. |
| Maximum Recommended Operating Temperature | 450° F./232° C. |
| Minimum Operating Temperature 20 cPs (20 mPa-s) | −58° F./−50° C. |
| Minimum Start-up Temperature 300 cPs (300 mPa-s) | −112° F./−80° C. |
| Viscosity at 60° F. cSt (mm$^2$/sec) | 2.4 |
| Density at 60° F./15.5° C. lb/gal (kg/m$^3$) | 6.4 (766) |
| Flash Point Closed Cup (D56) | >130° F./54° C. |
| Autoignition Temperature (maximum 10 sec ignition delay) | >500° F./260° C. |
| Boiling Point (14.7 psia/101 kPa) | 397° F./202° C. |
| Vapor Pressure @ maximum operating temperature psia (kPa) | 21 (145) |
| % Volume expansion over recommended operating temperature per 100° F. (° C.) | 6.8 (12.2) |
| Average Molecular Weight | 160 |
| Dielectric Breakdown voltage D1816-04 (kV, 0.1" gap) | 22.15 |
| Dielectric Constant (1 KHz) D924-04 | 2.03 |
| Dissipation Factor (1 KHz) D924-04 | 0.00001 |
| Volume Resistivity at 100 V (Ω-cm) D257-07 | $1.84 \times 10^{14}$ |
| Heat of combustion (approximate) BTU/lb (kJ/kg) | 20,000 (46,300) |
| Heat of vaporization (approximate) Btu/lb (kJ/kg) | 113 (262) |

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A vehicle charging system comprising:
a charging source providing an electrical charge;
a coolant source providing coolant;
a connector having both an electrical supply section delivering the electrical charge and a coolant supply section delivering the coolant;
an electric vehicle including an electric battery, the electric battery including a plurality of planar cells and an enclosure surrounding the cells so as to arrange the cells in a stack, the enclosure having an input and an output, the electric vehicle further including a receptacle for receiving the connector, a coolant conduit configured to direct the coolant from a coolant inflow section of the receptacle to the input of the enclosure and an electrical power connection between the electrical battery and the receptacle, the connector capable of connecting to the receptacle of the vehicle to charge the electric battery in the vehicle and to supply coolant from the coolant source through the coolant conduit into the input of the enclosure to cool the cells of the electric battery as the electric battery is charged; and
a controller receiving battery information of the electric battery and controlling the flow of coolant from the coolant source through the connector to the electric battery.

2. The vehicle charging station as recited in claim 1 wherein the connector includes a housing, the housing including the electrical supply section and the coolant supply section.

3. The vehicle charging station as recited in claim 1 wherein the electrical supply section indirectly connects to the vehicle wirelessly or inductively.

4. The vehicle charging station as recited in claim 1 wherein the connector has a lock.

5. The vehicle charging station as recited in claim 4 wherein the controller controls the locking of the lock such that the connector is locked when coolant is being supplied from the connector to the vehicle.

6. The vehicle charging station as recited in claim 1 wherein the connector includes a button for controlling the lock.

7. The vehicle charging station as recited in claim 1 wherein the connector includes an actuator for delivering charge and coolant from the connector to the vehicle.

8. The vehicle charging station as recited in claim 1 wherein the connector has a data connection for connecting the vehicle to the vehicle charging station, the battery information of the electric battery being transmitted to the controller via the data connection.

9. The vehicle charging station as recited in claim 1 further comprising a processor connected to at least one of a billing system and a credit card debit card device.

10. The vehicle charging station as recited in claim 1 further comprising a refrigeration unit for cooling the coolant.

11. The vehicle charging station as recited in claim 1 wherein the source charges an electric battery of the vehicle at 100 kW or more.

12. The vehicle charging station as recited in claim 1 wherein the coolant is gas supplied by the coolant source at 100 cubic ft/min or greater.

13. The vehicle charging station as recited in claim 1 wherein the coolant is liquid supplied by the coolant source at 0.1 liters/sec or greater.

14. The vehicle charging station as recited in claim 1 wherein the controller receives the battery information from a vehicle controller and controls the flow of coolant from the coolant source through the connector to the electric battery and the charging rate of the electric battery based on the battery information.

15. The vehicle charging station as recited in claim 1 wherein the controller controls the flow of coolant from the coolant source through the connector to the electric battery based on the battery information, the battery information including at least one of a temperature of the electric battery, an amount the electric battery is charged and the chemistry of the electric battery.

16. An electric vehicle comprising:
an electric battery powering a drive system of the vehicle, the electric battery including a plurality of battery cells, each of the battery cells including two parallel planar surfaces, the battery cells being spaced from each other to define a plurality of channels inside the electric battery between the cells, each of the channels being delimited by two of the battery cells such that each channel is between one planar surface of one of the battery cells and one planar surface of another of the battery cells;
a charging connector receptacle for removably receiving a connector of a charging station, the charging station supplying electric charge and coolant to the electric battery through the connector, the receptacle including an electrical inflow section for receiving electrical charge from the charging station via the connector and a coolant inflow section for receiving coolant from the charging station via the connector;
a coolant conduit between the electric battery and the receptacle configured to direct coolant from the coolant inflow section of the receptacle to the channels in the electric battery for cooling the electric battery; and
an electrical power connection between the electrical battery and the receptacle.

17. The electric vehicle recited in claim 16 wherein the electrical power connection includes an electrical conduit.

18. The electric vehicle recited in claim 16 further comprising a vehicle controller connecting to the charging station, the vehicle controller sending battery information of the electric battery to the charging station to determine the flow of coolant and electrical charge from the charging station through the receptacle to the electric battery.

19. The electric vehicle recited in claim 18 further comprising a sensor for measuring at least one of the temperature and voltage of the battery and providing feedback to vehicle controller for cooling and charging the battery.

* * * * *